Aug. 21, 1962 C. H. HUEBNER 3,050,578
RETAINER
Filed Aug. 7, 1958
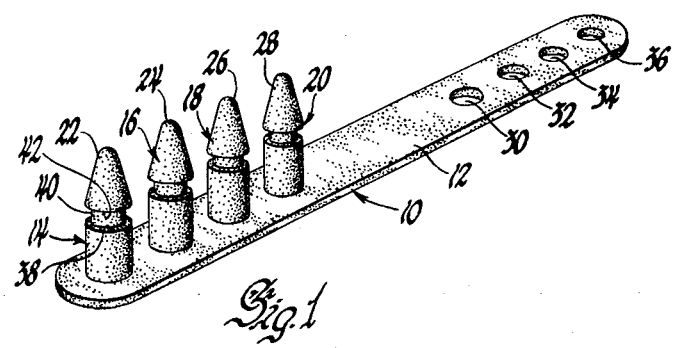
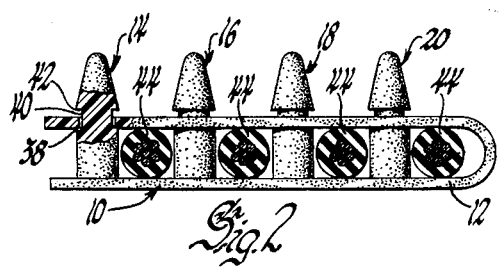
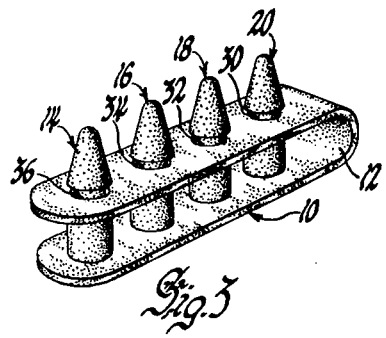
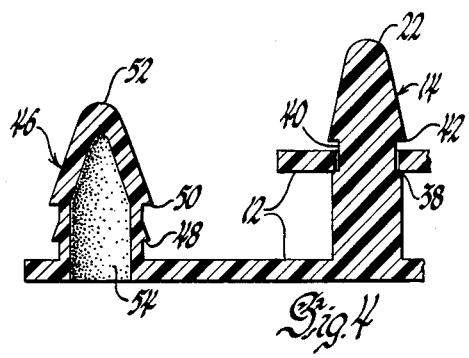
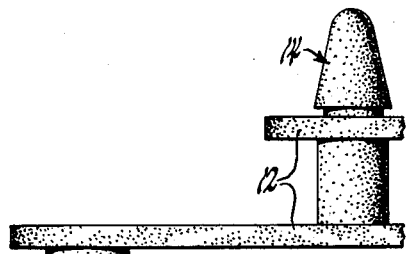
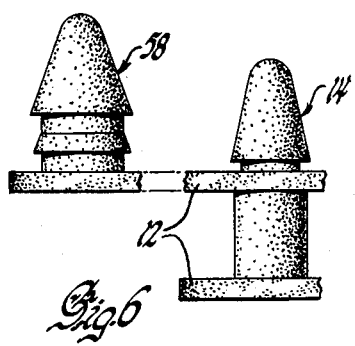
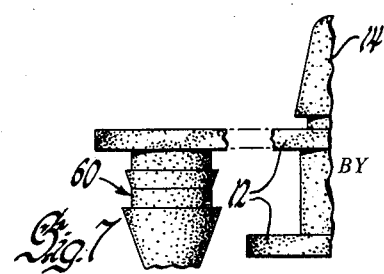
INVENTOR.
Charles H. Huebner
BY
D. D. McGraw
ATTORNEY

# United States Patent Office 3,050,578
Patented Aug. 21, 1962

3,050,578
RETAINER
Charles H. Huebner, Harper Woods, Mich., assignor to General Motors Corporation, Detroit, Mich., a corporation of Delaware
Filed Aug. 7, 1958, Ser. No. 753,748
5 Claims. (Cl. 174—40)

The invention relates to a retainer and more particularly to a retainer for holding and spacing longitudinally extending articles such as the ignition wires of automobiles in a desired spaced relation. The retainer will hold several wires together as a unit in order that they may be easily installed and handled while spacing the wires sufficiently far apart to insure a minimum clearance space between adjacent wires at all times. If desired, the retainer may be used as a mount and support for the wires so that they may be held in any desired position on a support member.

A retainer embodying the invention is preferably made of resilient plastic material which also effectively insulates the articles retained electrically, thermally, and mechanically from each other as well as from any supporting structure to which the retainer may be attached. The retainer is preferably of unitary construction with all of the portions being integrally formed by any suitable process such as molding. The retainer is shown as being made as an integral unit although it may be desirable in some instances to form portions of the retainer independently and attach them to the retainer body.

In the drawing:

FIGURE 1 is a perspective view of a retainer embodying the invention.

FIGURE 2 illustrates the retainer of FIGURE 1 in the installed position with parallel wires being held in place. Portions of the retainer of this figure have parts broken away and in section.

FIGURE 3 is a perspective view of the retainer of FIGURE 1 showing that retainer in the locked position but with the wires being removed for clarity.

FIGURE 4 is a cross section view of a portion of a modified retainer with parts broken away.

FIGURE 5 is an elevation view of another modification of the retainer with parts broken away.

FIGURE 6 illustrates another modification of the retainer with parts broken away.

FIGURE 7 illustrates an additional modification of the retainer with parts broken away.

The retainer 10 is formed to include a strap body 12 which has several fastening lugs secured thereto adjacent one end. Lugs 14, 16, 18 and 20 are illustrated as being integrally formed from the strap body 12. The lugs are respectively provided with rounded ends 22, 24, 26, and 28. They extend outwardly from the upper surface of the strap body and are generally normal thereto and are therefore substantially parallel to each other.

The other end of the strap body 12 is provided with a series of apertures 30, 32, 34, and 36 which extend through the strap body. A strap body center section is provided intermediate the series of lugs and the series of apertures.

Since each of the fastening lugs are similar in construction, only lug 14 will be described in further detail. An annular shoulder 38 is provided on the lug at a predetermined distance from the strap body 12 by forming a reduced section 40 circumferentially about the lug. The formation of this reduced section also provides an annular barb 42 which tapers outwardly to the rounded end 22. The distance between the shoulder 38 and the strap body 12 may be determined by the minimum thickness of the articles to be retained. Similarly, the distance between the annular barb 42 and the strap body 12 may be determined by the maximum thickness of the articles to be retained. The reduced section 40 is preferably of a width only slightly greater than the thickness of the strap body for reasons which will become obvious.

When installing the retainer on a series of parallel elements such as the wires 44, these wires are first placed between adjacent lugs with one of the wires being adjacent lug 20 and toward the center portion of the strap body. The end of the retainer having the apertures formed therein is then bent over the wires so that a reverse bend occurs in the center section of the strap and the lugs extend through the apertures. The apertures 30, 32, 34 and 36 are spaced in accordance with the respective lugs to permit the lugs to extend through them. Although all of the lugs and apertures are illustrated as being equally spaced, it may be desirable to provide unequal spacing to accommodate articles having various widths. The apertures are of such size that they can be snapped over the annular barbs 42 and will be finally positioned and retained at the reduced sections 40. In order to permit the snapping and retaining actions required, it is preferable to have the retainer formed from a resilient material and to make the aperture slightly smaller in diameter than the outer diameter of the annular barbs 42. The apertured portion of the retainer will then be held in place by the locking lugs which act as fastening means. The wires or other articles 44 are then retained in the desired spaced relationship relative to each other.

The modified retainers shown in FIGURES 4 through 7 are provided with mounting lugs by which the retainer may be secured to any suitable support member such as a sheet metal panel. The modification of FIGURE 4 illustrates the mounting lug 46 as being formed on the terminal end of the strap body to which the locking lug 14 is adjacent. Mounting lug 46 is preferably spaced from lug 14 a sufficient amount to permit its use as described below. This lug may be provided with a first annular barb 48 which surrounds the body of the lug and is spaced from the strap body 12. It also may be provided with a second annular barb 50 which is spaced from bar 48 and located toward the rounded end 52 of the lug. Lug 46 may be tapered to a generally conical shape between barb 50 and end 52 in a manner similar to the tapered formation of the locking lugs between their barbs 42 and respective rounded ends. Lug 46 is also preferably provided with a recess 54 which extends from the lower surface of the strap body through the body of the lug and terminates within the conical portion thereof. Since the lug is preferably integrally formed with the strap body and is therefore manufactured from the same material, it is also flexible. The recess 54 is provided to permit a slight radial collapse of the annular barbs 48 and 50 so that the lug may be readily extended into an aperture formed in any suitable supporting member. The aperture may also receive an installing tool similar to an awl which when pushed against the bottom of the recess will stretch the lug along its axis so as to effectively decrease the barb diameters and air in installation of the lug through the receiving aperture. Although two barbs 48 and 50 are shown, one or more barbs may be provided as desired. The advantage of providing a plurality of barbs lies in the fact that the lug may then be installed through any of several supporting members having somewhat different thicknesses. A barb will still be available to lock the mounting lug to the supporting member by expanding after it passes through the supporting member aperture.

The modification shown in FIGURE 5 includes a mounting lug 56 which is preferably constructed in the same manner as lug 46 of FIGURE 4 except that the lug is formed on the opposite side of the strap body relative to the locking lugs 14 through 20. Lug 56 also extends generally parallel to the locking lugs and therefore extends substantially normal to the plate of the strap body. This position may be desired at times when the supporting member to which the retainer may be attached is so constructed that it is preferable to receive a flat side of the retainer adjacent the supporting member.

The modification of FIGURE 6 shows a mounting lug 58 which is generally similar to lugs 46 and 56 with the mounting lug in this instance being formed on the end of the strap body 12 to which the locking apertures 30 through 36 are adjacent. The lug 58 extends from the strap body 12 on the opposite side from that of the locking lugs 14 through 20 and is generally parallel to those lugs. When the strap is in the installed position shown in FIGURE 6, the mounting lug 58 then extends in the same direction as the locking lugs.

The modification shown in FIGURE 7 includes a mounting lug 60 which is generally similar to mounting lugs 46, 56, and 58. It is also formed on the end of the strap body 12 to which the locking apertures are adjacent, but is formed on the same side of the body as are the locking lugs 14 through 20. When the strap is in the installed position illustrated in FIGURE 7, lug 60 will then extend in the opposite direction from lug 14.

Any of the modifications shown may be employed according to the particular installation required. The invention has thus provided flexible retainers which are inexpensive to manufacture, easy to install, and effective to retain articles in a parallel position and desired spaced relation. Such retainers have been found to be particularly useful to retain the ignition wires of an internal combustion engine. They are advantageous in comparison to metal retainers now commonly used in that they reduce the wear incident to movement of the wires within the retainer and provide an excellent insulation at all times.

What is claimed is:

1. An integrally formed plastic insulating retainer for holding and spacing a plurality of parallel engine ignition wires and the like, said retainer comprising a flexible strip section, a plurality of spaced locking lugs integrally formed with said strip section adjacent one end thereof with each of said lugs having a body section and a rounded end and an annular groove formed in said body section adjacent said rounded end to define an annular barb on the rounded end side thereof and an annular shoulder on the other side thereof, the other end of said strip section having a plurality of apertures formed therein in spaced relation so that, when said strip section is reversely bent intermediate said lugs and said apertures, said lugs extend through said apertures and receive said strip section other end in said grooves to retain said strip section other end in parallel spaced relation to said strip section one end and to form apertures defined by said lugs and said strip section for receiving ignition wires and the like and maintaining them in completely insulated spaced relation, one extreme end of said strip section having a mounting lug integrally formed therewith and extending normally therefrom and having at least one annular barb thereon and a hollow recess extending within said annular barb, said mounting lug thereby being adapted to mount and support and retain said retainer and the wires on an apertured support member.

2. The retainer of claim 1, said mounting lug extending parallel to said other lugs and from the opposite side of said strip section relative to said locking lugs.

3. The retainer of claim 1, said mounting lug being positioned at the flexible strip section end to which said locking lugs are adjacent and extending from the same side of said flexible strip section as and parallel to said locking lugs.

4. The retainer of claim 1, said mounting lug being positioned at the end of said flexible strip section adjacent said apertures and extending parallel to and on the opposite side of said flexible strip section from said locking lugs.

5. The retainer of claim 1, said mounting lug being positioned on the terminal end of said flexible strip section adjacent said apertures and extending parallel to and on the same side of said flexible strip section as said locking lugs.

References Cited in the file of this patent

UNITED STATES PATENTS

| | | |
|---|---|---|
| 170,190 | Pratt | Nov. 23, 1875 |
| 441,693 | McElroy | Dec. 2, 1890 |
| 1,318,503 | Meyer | Oct. 14, 1919 |
| 1,539,045 | Gossom | May 26, 1925 |
| 2,340,560 | Rempt | Feb. 1, 1944 |
| 2,397,801 | Mitchell | Apr. 2, 1946 |
| 2,458,104 | Frison | Apr. 10, 1951 |
| 2,759,390 | Edwards | Aug. 21, 1956 |
| 2,870,502 | Sasse | Jan. 27, 1959 |

FOREIGN PATENTS

| | | |
|---|---|---|
| 67,926 | France | Oct. 14, 1957 |
| 16,080 | Great Britain | 1908 |

UNITED STATES PATENT OFFICE
CERTIFICATE OF CORRECTION

Patent No. 3,050,578                  August 21, 1962

Charles H. Huebner

It is hereby certified that error appears in the above numbered patent requiring correction and that the said Letters Patent should read as corrected below.

Column 2, line 61, for "air" read -- aid --; column 4, line 45, for "2,458,104" read -- 2,548,104 --.

Signed and sealed this 11th day of December 1962.

(SEAL)
Attest:

ERNEST W. SWIDER
Attesting Officer

DAVID L. LADD
Commissioner of Patents